Patented Nov. 17, 1931

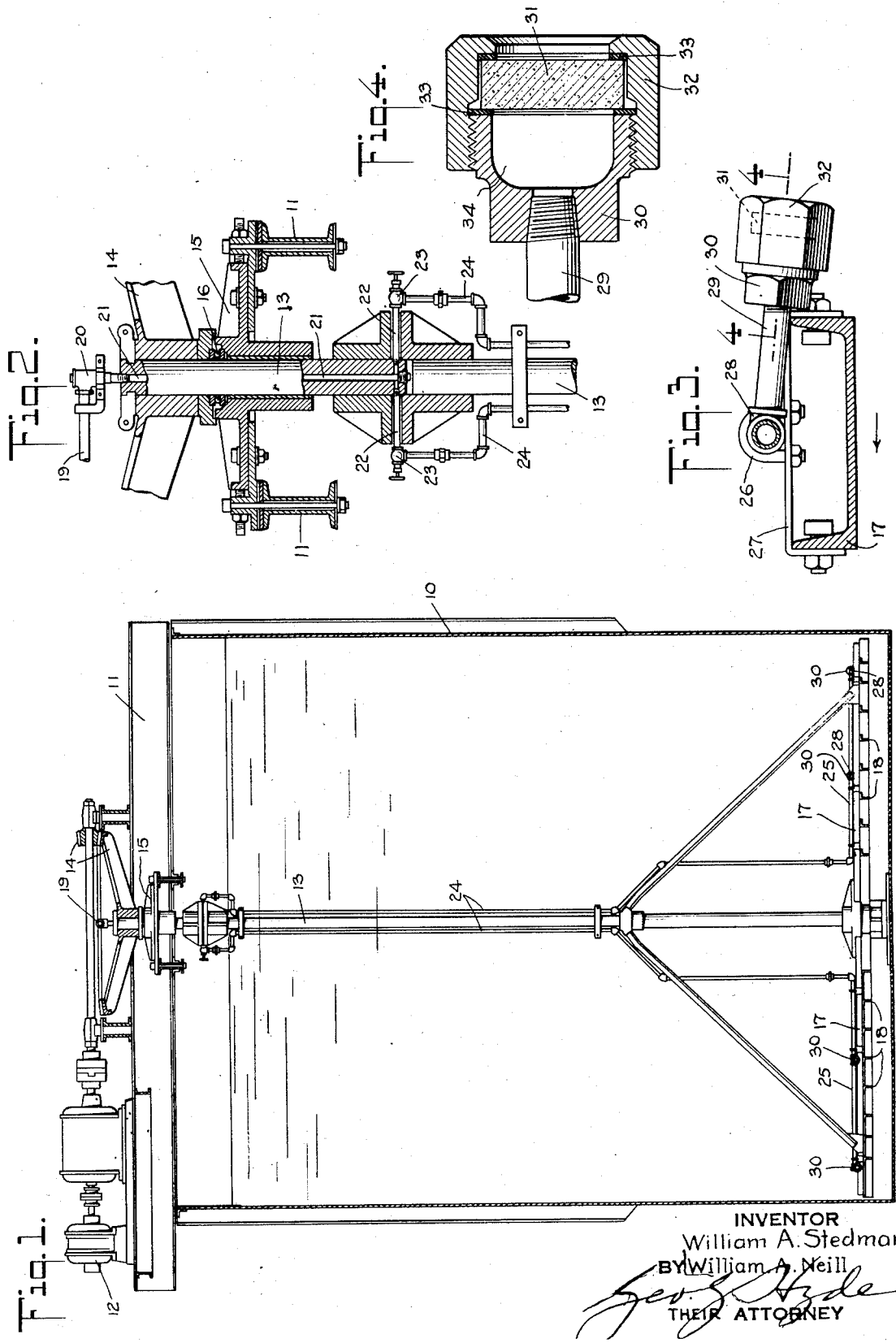

1,832,469

UNITED STATES PATENT OFFICE

WILLIAM A. NEILL, OF MOUNT VERNON, NEW YORK, AND WILLIAM A. STEDMAN, OF WESTPORT, CONNECTICUT, ASSIGNORS, BY MESNE ASSIGNMENTS, TO THE DORR COMPANY, INC., OF NEW YORK, N. Y., A CORPORATION OF DELAWARE

METHOD AND APPARATUS FOR AERATING SLURRY

Application filed June 1, 1929. Serial No. 367,786.

This invention relates to agitators or mixers of the type in which air or other gas is blown into the bottom of a body of liquid to produce circulation therein, such for instance as the type of mixer commonly used for maintaining uniformity in cement slurry during correction and storage.

In the operation of such slurry mixers it is frequently necessary to shut down the mixers from time to time for various well known reasons. During the shut-down the introduction of air is discontinued either for reasons of economy or because of difficulties with the air supply system; and the back pressure of the slurry on the nozzles through which the air is injected forces slurry back into the nozzles and air pipes. Owing to the slimy, adhesive and very fine solid particles in the slurry, this necessarily results in the building up of solids in the air pipes and plugging of the nozzles, as the slurry under such circumstances has a decided tendency to set.

Various types of air valves have been tried; but owing to the heavy back pressure no air valve has been found that does not permit sufficient leakage of air to allow the slurry to enter the nozzles. Likewise rubber flap arrangements and other types of self sealing nozzles have been tried, but for the reasons given are not successful in keeping out all of the slurry, besides being subject to deterioration. As the nozzles are located at the bottom of relatively deep tanks, it is a difficult and somewhat expensive task to clear or replace them; and frequently plugging of a portion of the nozzles cannot be noticed until defective cement caused by inadequately mixed slurry indicates the defect.

The broad object of this invention is the provision of a slurry mixer with air nozzles that will be free from clogging and building up when the air is shut off regardless of the unavoidable backflow through the nozzles and into the connecting pipes. In general this object is accomplished by employing a porous diaphragm or plate extending across the outlet of each air pipe, the plate being composed of a porous material adapted to permit an adequate amount of air to pass without undue resistance, but also serving to prevent the solid constituents in the slurry from passing back through the plate into the air passage when the air is shut off. The plate is preferably composed of filtros or other tile having very fine pores through which the air can be forced in known manner. When the air is cut off this type of plate will permit water in the slurry to flow back into the air passage; but the solids will be arrested at the surface of the plate, forming in time a cake which will gradually arrest the flow of water. It has been found in practice that the solid particles of the slurry will not penetrate the plate to any substantial extent; and that when air pressure is again turned on the flow of water and then air through the plate will remove completely all of the solid particles which have accumulated on the plate without any tendency to blind or reduce its capacity to pass air.

While nozzles of this type may be used and operated in various ways, it is advantageous to provide means for moving the nozzles through the slurry while air is being introduced, since there is some tendency for the very fine bubbles of air to coalesce on the surface of the plates when stationary, and it is generally considered advantageous to have the air introduced in as fine bubbles as is practicable. This can be accomplished by mounting the nozzles on rotating mechanism such as that employed in the standard Dorr slurry mixers.

It has likewise been found advantageous to design or position the nozzle in such a way that solids settling during a shut-down cannot fall directly on the plate. This can be accomplished by arranging the nozzle so that the plate is directed downwardly or is covered to a certain extent by the nozzle casing, in which position the solids will tend to settle away from the plate and clear liquid will accumulate along the face of the plate, reducing the amount of solid material that must be arrested by the plate.

Other objects and advantages of the invention will be apparent from the following description taken in connection with the accompanying drawings in which Fig. 1 is a vertical central section through a typical slurry mixer;

Fig. 2 is an enlarged detail showing of the shaft supporting arrangement with air connections;

Fig. 3 is a transverse section through a raking arm showing an air nozzle in operative position; and Fig. 4 is a longitudinal central section through an air nozzle on line 4—4 of Fig. 3.

While as already indicated nozzles of the type contemplated by this invention may be employed in various forms of well known slurry mixers, they are illustrated in connection with a slurry mixer of the Dorr type. This comprises in general a tank 10 having supporting beams 11 across the top carrying the motor 12 which drives shaft 13 through gears 14. Shaft 13 is mounted on beams 11 through head plate 15 carrying the thrust bearing 16 supporting the shaft. Rake arms 17 are mounted on the lower end of shaft 13 in the usual way, and carry rakes 18 for stirring up solids below the air nozzles and preferably impelling them toward the center to prevent the usual tendency of the solids to accumulate along the bottom.

The air for agitation is introduced by a suitable piping system having nozzle terminals adjacent the bottom of the tank. Where rotating arms are employed as in the form illustrated the air system preferably passes downwardly along the shaft and the nozzles may be distributed along the arms, this arrangement serving to introduce the air evenly over substantially the entire bottom of the tank.

One illustrative arrangement of an air system of this type is shown in which the air is introduced through a feed pipe 19 and a swivel stuffing box 20 to a bore in the shaft 13 communicating below the bearing 16 with lateral distributing pipes 22 connected through valves 23 to pipe lines 24 extending along shaft 13 to discharge nozzles 30 in the lower part of the tank 10. As shown in Fig. 1 the pipe lines 24 may have extension pipes 25 at their lower ends running along and mounted on the rake arms 17, as by U-bolts 26 and clamp plates 27 bolted to the arms 17. The nozzles 30 are mounted on extension pipes 25 in any suitable manner, as by means of T's 28 carrying nipples 29 threaded into the nozzle bodies 30. The extension pipe 25 and nipple 29 preferably are located and proportioned so that the nozzle body 30 is located beyond the arm 17 on which nipple 29 rests to provide a downward slope from the extension pipe 25 in the direction opposite to that in which the arm moves. This arrangement shields the plates from impact with solid particles during movement of the arms and facilitates the discharge and dissemination of extremely fine bubbles of air.

Obviously the air discharge plates or diaphragms may be mounted and arranged in a variety of ways depending principally upon the material employed, the type of agitator in which the nozzles are mounted and the material to be treated. A simple arrangement adapted for cement slurry mixers is disclosed, adapted for the use of a porous tile. As shown in Fig. 4 the arrangement includes a cup shaped nozzle body 30 into which the air line nipple 29 is threaded, a porous plate 31 extending across the open end of body 30, and an annular clamping cap 32 threaded over body 30 to hold plate 31 in position, gaskets 33 of rubber, leather or other suitable material serving to protect the edges of the plate 31 from damage from clamping pressure and likewise to provide a tight seal around the edges of plate 31. It will be seen that the cup shape of the nozzle body 30 provides a chamber 34, which may be called a water chamber in that, in the event of insufficient pressure in the air supply system, water in the slurry is forced, by back pressure, through the diaphragm into the chamber 34, rearward passage of the solid constituents of the slurry being prevented by the diaphragm. Upon establishing a suitable pressure in the air supply system, the water in the chamber 34, will be forced outwardly through the diaphragm or porous plate 31, which will thereby be freed of any solid constituents of the slurry which may have accumulated thereon. The chamber 34 being part of the nozzle body, is readily removed and cleaned of any solids, whereas it is very difficult to clean thoroughly pipes permanently mounted at the bottom of a deep mixer.

It will be apparent from the foregoing description that numerous modifications in the arrangement shown, including the use of other materials for the air distributing plate, may be employed within the scope of this invention. While the invention is primarily intended to solve problems peculiar to the agitation of cement slurry with air, certain features of the invention will be applicable to other uses which present analogous problems.

For instance, the invention is capable of use in any apparatus where air or fluid under pressure is to be injected into a fluid-mass to either agitate or aerate the mass, where the mass is of such a nature as to have a clogging effect upon the air or fluid outlet. To that end it is to be understood that the term "nozzle" as used herein is meant to be broad enough to include the pressure inlet to the mass to be aerated or agitated, and the term "slurry" is broad enough to cover the fluid-mass or sludge to be treated.

We claim:

1. The method of aerating the contents of a mixer which includes forcing air from a pressure line through a diaphragm of fine porous material below the surface of the mixer contents and when the air is cut off, permitting water to flow back into the pressure line while rejecting at the outer surface of the diaphragm such solid material as would accumulate in the air passages, until the flow of water is checked by accumulation of said solid constituents, and, upon renewal of the air supply, forcing substantially all the water back through the diaphragm and forcing therefrom the accumulation of such solid constituents.

2. An air nozzle unit including a body having a water chamber and means for attachment to an air supply line, a diaphragm across the outer end of said water chamber, and having pores of such size as to permit the passage of air therethrough from said air supply line and the passage of water into said chamber due to back pressure, or from said chamber under the air pressure from said air supply line but to prevent the passage of solid material therethrough and a cap positioned over said diaphragm and secured to said body to hold the diaphragm against said body, said cap having an opening through which the outer face of the diaphragm is exposed.

3. The combination with a slurry mixer tank and an air supply system, of a nozzle in said tank including a downwardly inclined nozzle body having an axial outlet and a diaphragm arranged across said outlet and having fine pores to admit air therethrough, said casing projecting around the diaphragm to protect the outer surface of the diaphragm from solids settling from such slurry.

4. The combination with a slurry mixing tank, of an air supply system, a revolving device including a substantially vertical revolving shaft and an arm projecting therefrom, and a trailing air nozzle attached to said arm and connected with said air supply system and including a diaphragm of porous material of sufficient fineness to permit the passage of air therethrough into said tank, and, upon cutting-off of the air, to permit water to be forced rearwardly therethrough by the back pressure, but preventing the rearward passage of solid constituents of the slurry, said nozzle being arranged with its inner passages in a continuous downward direction toward the porous diaphragm to prevent trapping of liquid therein.

5. The combination with a slurry mixing tank, of an air supply system, a revolving device including a substantially vertical revolving shaft, a member projecting therefrom and a trailing air nozzle carried by said member and connected with said supply system and including a fine-pored diaphragm having pores of sufficient fineness to permit the passage of air therethrough into said tank, but, upon cutting-off of the air, to permit water to be forced rearwardly therethrough by the back pressure, but preventing the rearward passage of solid constituents of the slurry, said diaphragm being countersunk in the face of the nozzle to prevent settling thereon of said solid constituents.

6. The combination with a mixing tank, of an air supply system, a revolving device including a substantially vertical revolving shaft, an arm projecting from said shaft, and a trailing air nozzle carried by said arm and connected with said supply system and including a fine-pored diaphragm permitting the passage of air therethrough into said tank, and, upon cutting-off of the air, permitting water to be forced rearwardly therethrough by the back pressure but preventing the rearward passage of solid constituents of the slurry and a cap projecting beyond said diaphragm to prevent settling of said solid constituents on said diaphragm.

In testimony whereof we affix our signatures.

WILLIAM A. NEILL.
WILLIAM A. STEDMAN.